United States Patent [19]

Pezzi

[11] 4,406,156

[45] Sep. 27, 1983

[54] METHOD AND DEVICE FOR THE INSPECTION OF VENTILATED CIGARETTES

[75] Inventor: Giovanni Pezzi, Bologna, Italy

[73] Assignee: CIR S.p.A. Divisione SASIB, Bologna, Italy

[21] Appl. No.: 228,882

[22] Filed: Jan. 22, 1981

[30] Foreign Application Priority Data

Jan. 29, 1980 [IT] Italy .............................. 12428 A/80

[51] Int. Cl.³ ............................................. G01N 15/08
[52] U.S. Cl. .......................................................... 73/38
[58] Field of Search .................... 73/38, 45, 45.1, 45.2

[56] References Cited

U.S. PATENT DOCUMENTS

| 3,769,832 | 11/1973 | Baier | 73/41 |
| 4,127,025 | 11/1978 | Mills et al. | 73/38 |
| 4,154,090 | 5/1979 | Heitmann et al. | 73/38 |
| 4,177,670 | 12/1979 | Heitmann et al. | 73/38 |

Primary Examiner—Anthony V. Ciarlante
Assistant Examiner—Joseph W. Roskos
Attorney, Agent, or Firm—Spencer, Kaye & Frank

[57] ABSTRACT

For the electropneumatic inspection of the longitudinal and/or transversal permeability of the ventilated cigarettes, each cigarette is subjected in any order of succession to at least three of the four inspections consisting in applying a pneumatic pressure alternatively to each of the two cigarette ends, while keeping the opposite end open and subsequently closed. Each of these inspections determines the pneumatic resistance met at the respective cigarette inlet and the values of these resistances are converted into electric signals and used for determining the longitudinal and/or transversal permeability of the cigarette. For this purpose use is made of four-terminal network theory, by considering that the cigarette pneumatic resistance can be regarded as composed of an equivalent transversal resistance, derived from two equivalent longitudinal resistances in series with each other.

13 Claims, 14 Drawing Figures

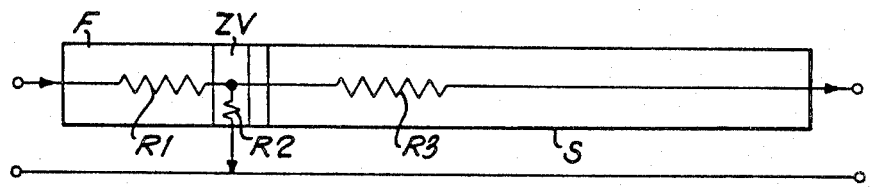
Fig.2
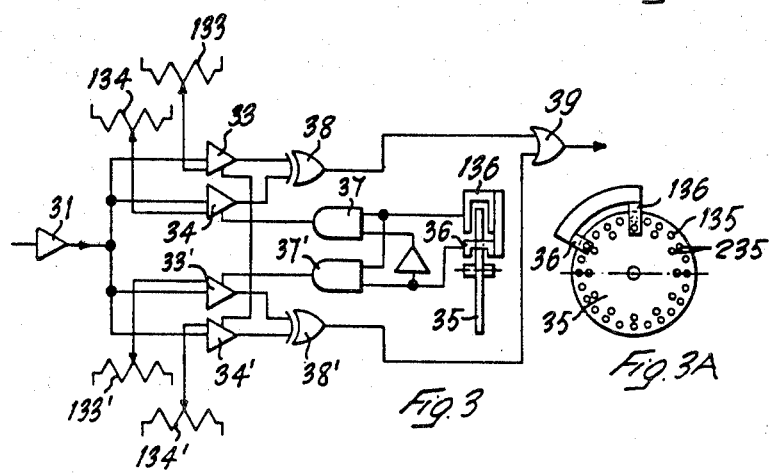
Fig.3  Fig.3A
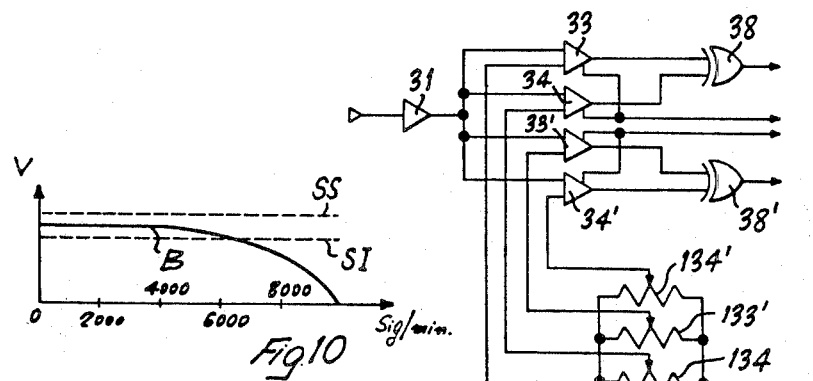
Fig.11
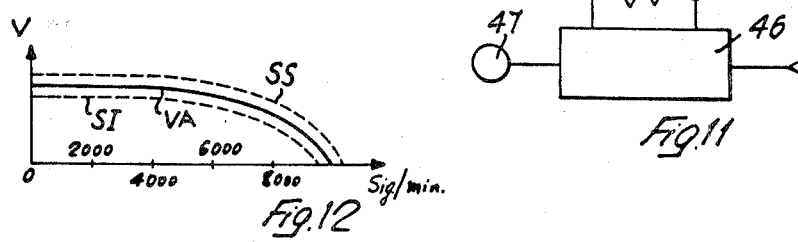
Fig.10
Fig.12

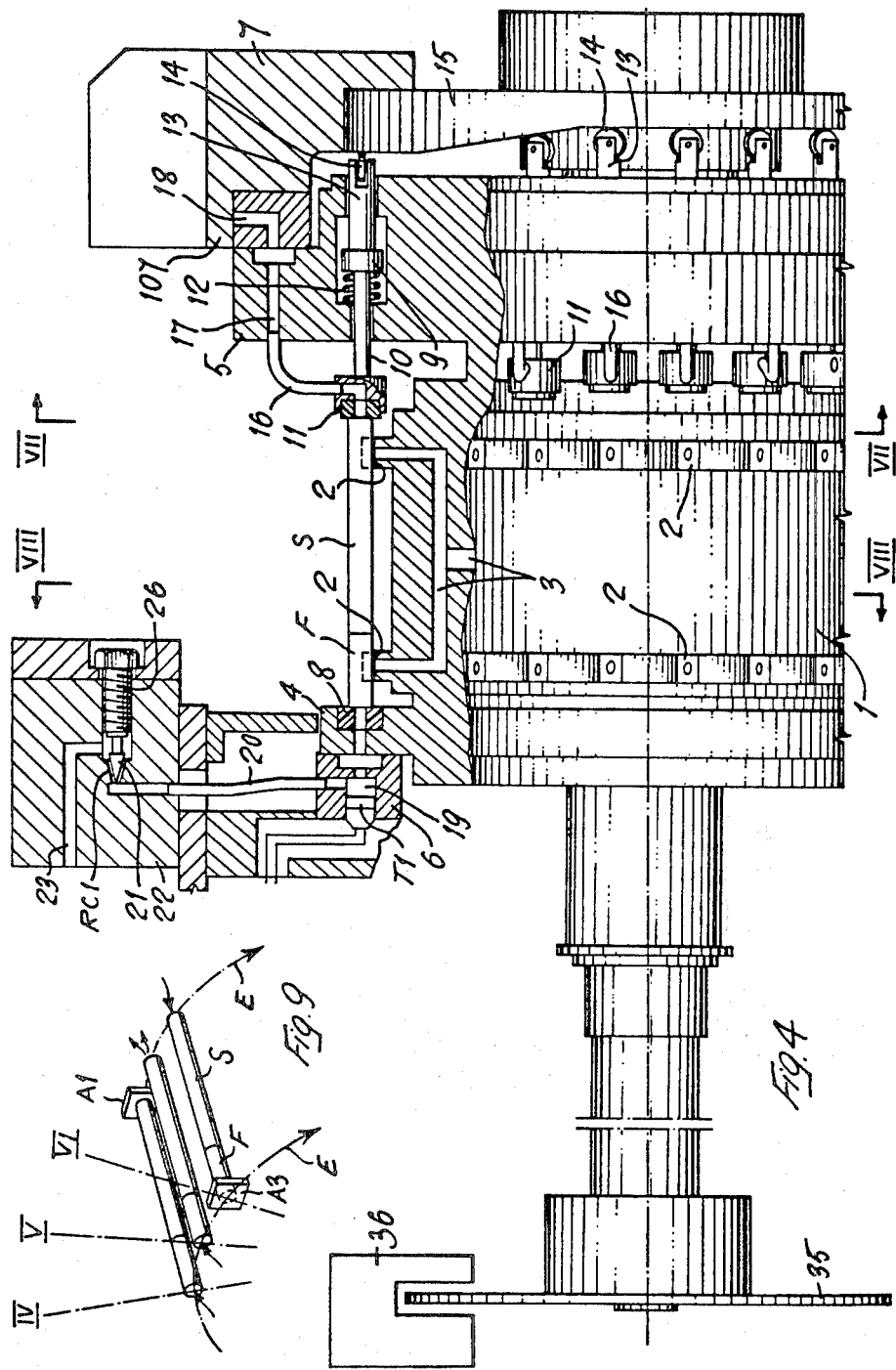

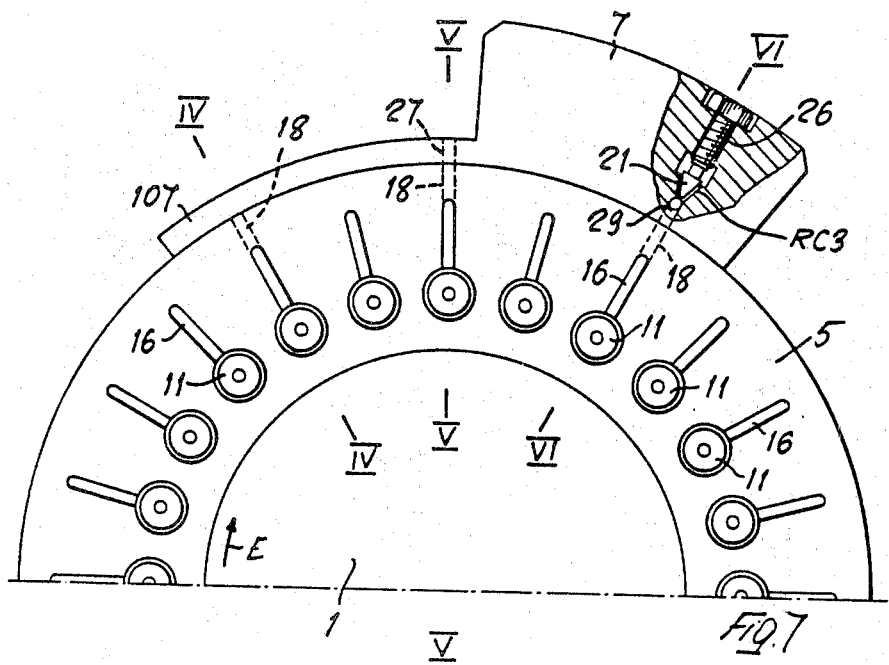
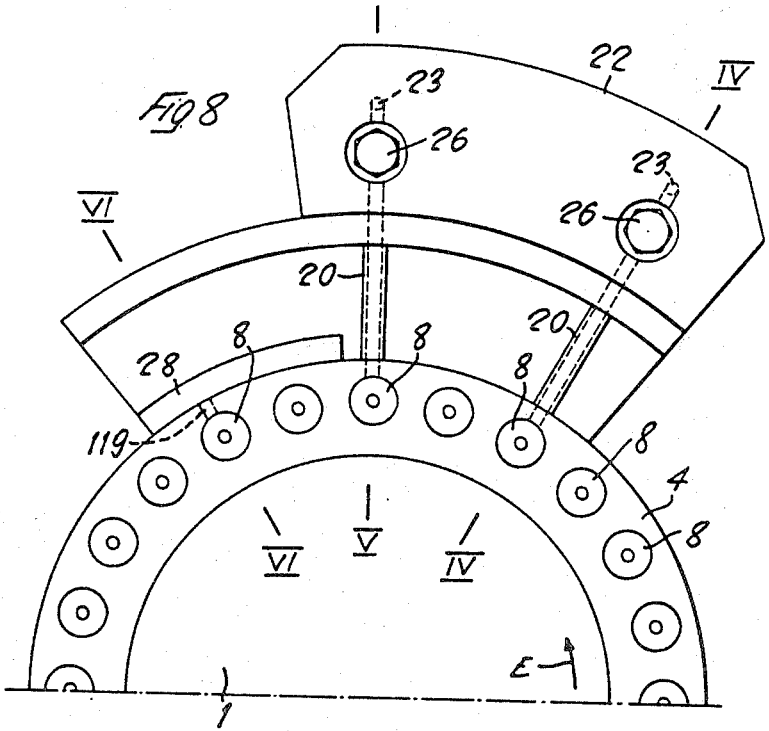

METHOD AND DEVICE FOR THE INSPECTION OF VENTILATED CIGARETTES

BACKGROUND OF THE INVENTION

An object of this invention is to provide a method and a device for the electropneumatic inspection of the longitudinal and/or transversal permeability of the so-called ventilated cigarettes. A ventilated cigarette is one which is provided with a ventilation area near its mouthpiece in which the cigarette filter and/or wrapper is intentionally given a higher permeability by providing it, for instance, with very small holes.

Devices are known, for instance, from Italian Pat. No. 887,698 for the inspection of the pneumatic cigarette seal and, consequently, of the wrapper integrity, by applying a pneumatic pressure to a cigarette end and then measuring the pneumatic pressure drop at the cigarette inlet.

These known devices cannot be used at all for the electropneumatic inspection of ventilated cigarettes, since the pneumatic seal inspection is rendered less efficacious by the presence of the small ventilation holes.

For the specific electropneumatic inspection of ventilated cigarettes many other methods and devices have been proposed which are, however, very laborious to carry out and complicated. For instance, one known methods involves the occlusion of the ventilation area by means of quite complicated and functionally inaccurate devices.

The purpose of this invention is to provide a method and device for the electropneumatic inspection of ventilated cigarettes, without occluding the ventilation area of the cigarettes, and which allows the objective determination of the intrinsic characteristics of longitudinal and/or transversal permeability of the cigarettes.

SUMMARY OF THE INVENTION

This purpose is obtained by the invention which subjects each cigarette, in any order of succession, to at least three of four inspections which consists of applying a pneumatic pressure alternatively to each of the two cigarette ends, first with the opposite end of the cigarette open and then with the opposite end closed. Each of these inspections determines the pneumatic pressure drop met at the respective cigarette inlet, and the values of these pressure drops being converted into electric signals and used for determining the longitudinal and/or transversal permeability of the cigarettes by representing the cigarette with an equivalent four-terminal electric network. In this network, the cigarette pneumatic resistance is composed of an equivalent transversal resistance derived from the equivalent longitudinal resistances in series with each other.

According to the invention, the pneumatic inlet resistance met at each cigarette end can be determined by applying a known pneumatic pressure and by checking the air flow when the opposite end is kept open and subsequently closed. The pneumatic resistance results then from the ratio between the applied pressure and the corresponding flow. The pneumatic inlet resistance met at each cigarette end can be, however, determined also by applying a known pneumatic pressure by means of a pneumatic reference resistance also known and by detecting the pressure reached in the cigarette when its end is kept open and subsequently closed.

BRIEF DESCRIPTION OF THE DRAWINGS

These and other features of the invention and the resulting advantages will be understood from the following description of some preferred embodiments, given as a non restrictive example, in the attached drawings, in which:

FIG. 1A shows a front elevation of the synchronization disk according to FIG. 1;

FIG. 2 shows a diagram of the pneumatic resistances equivalent to a ventilated cigarette;

FIG. 3 shows a partial circuit of a modification of the embodiment of the device according to FIG. 1;

FIG. 3A schematically shows a front elevation of the synchronization disk according to FIG. 3;

FIG. 4 shows a side elevation of the mechanical part of a device according to the invention, in axial section taken on line IV—IV of FIGS. 7 and 8;

FIGS. 7 and 8 show the upper part of the device according to FIGS. 4 to 6, in cross section taken on lines VII—VII and VIII—VIII of FIG. 4;

FIG. 9 shows a schematic perspective view of the inspection units to which the cigarettes are subjected in the stations corresponding to FIGS. 4, 5 and 6 and to sections IV, V and VI of FIGS. 7 and 8;

FIG. 10 is a diagram showing changes in an inspection signal for a cigarette of normal quality as a function of a variation of the cigarette inspection speed;

FIG. 11 is an electrical diagram of a reference signal supplying circuit for the variant of the embodiment according to FIG. 3;

FIG. 12 is a diagram showing the reference signal supplied by the supplying circuit according to FIG. 11 with respect to the cigarette inspection speed.

DESCRIPTION OF THE PREFERRED EMBODIMENTS

Referring to FIG. 2, it is known that a so-called ventilated cigarette S has in its filter F and/or in its wrapper near the mouthpiece, a perforated ventilation area ZV or an area of higher permeability.

Figure 1:
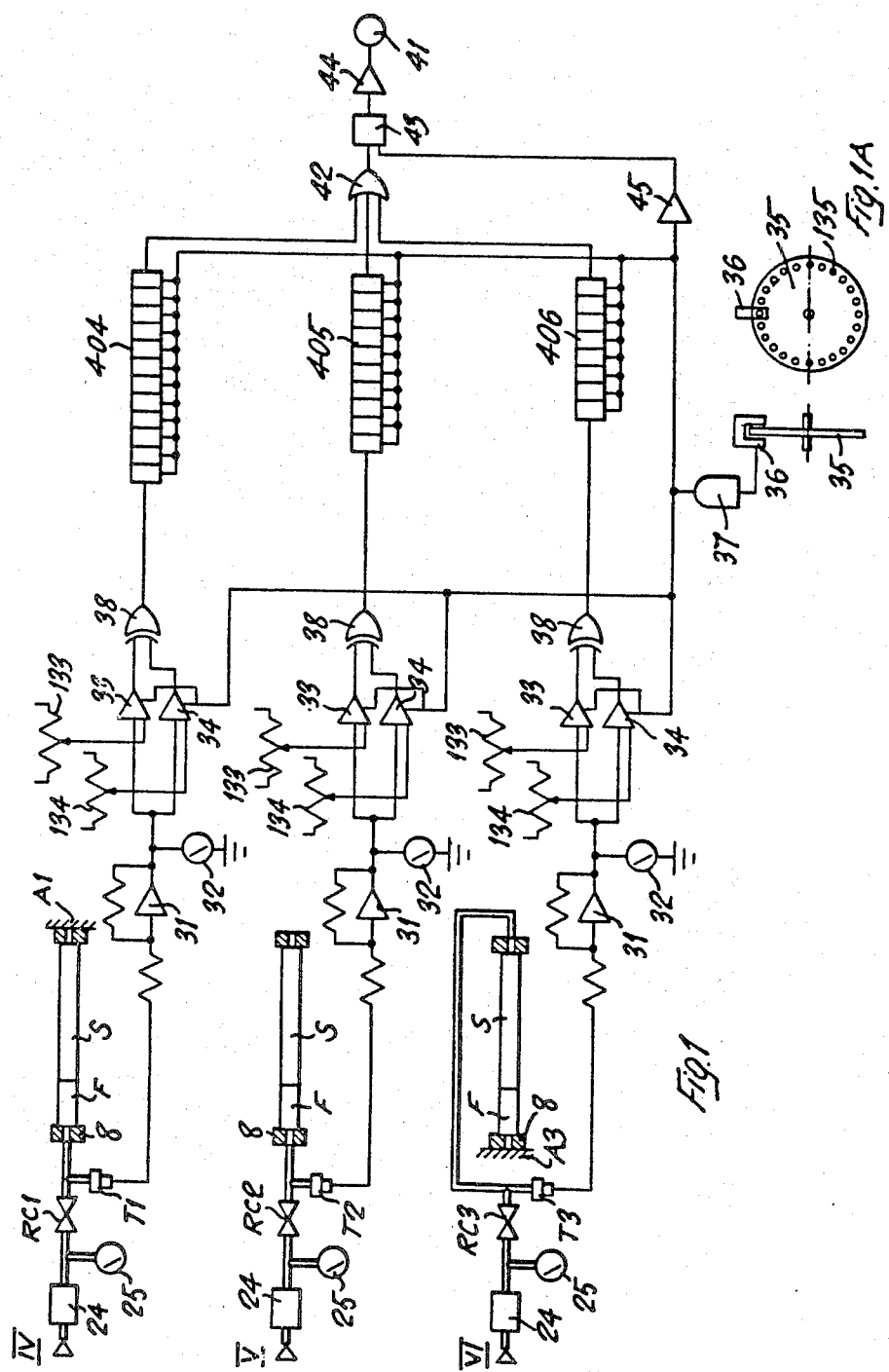
FIG. 1 shows the electric system of a device according to the invention.

The method according to the invention for the pneumatic inspection of the longitudinal and/or transversal permeability of the ventilated cigarette S is based on the understanding that the pneumatic resistance of a cigarette S of this type corresponds to the diagram shown in FIG. 2, that is, it can be considered composed on an equivalent transversal resistance R2, corresponding to the losses attributable to the ventilation area ZV and to possible wrapper defects (holes, tears, excessive porosity, etc), and derived between two resistances R1 and R3 in series corresponding to the draught longitudinal resistances at the mouthpiece and at the opposite end. According to the invention, in order to determine the values of the equivalent resistances R1, R2 and R3, the cigarette is subjected to at least three of the following inspections:

(1) With reference to FIG. 1, at the mouthpiece (filter F) of cigarette S, a pneumatic inspection pressure is applied by means of a known pneumatic reference resistance RC1, while keeping *closed* the opposite end of the cigarette by means of any suitable sealing element A1 and detecting, by means of any suitable transducer T1, the value of the pressure reached in the cigarette, generally after a certain fixed period of time (see FIG. 4 and station IV in FIG. 1).

Figure 5:
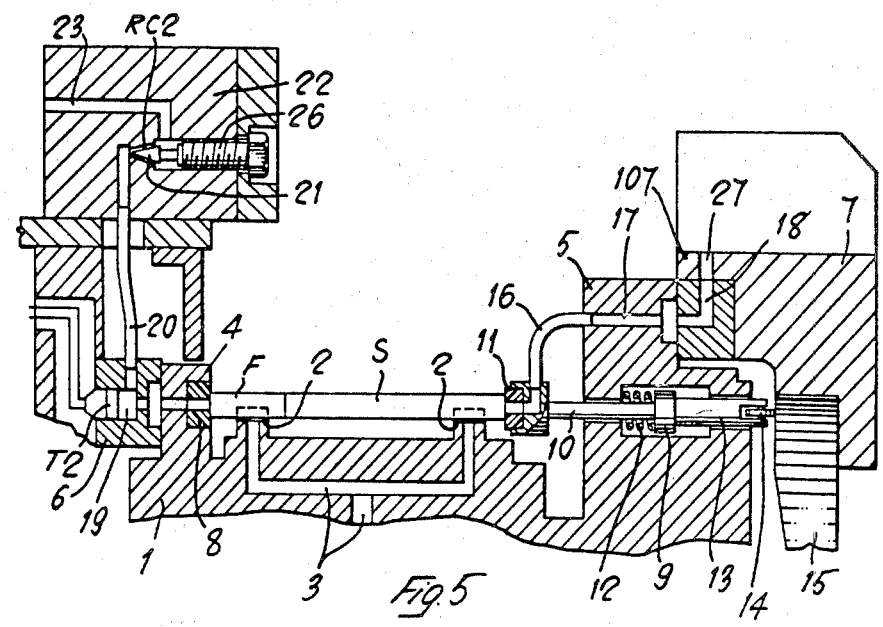
FIGS. 5 and 6 show part of the device according to FIG. 4, in axial section taken on respective lines V—V and VI—VI of FIGS. 7 and 8.

(2) At the mouthpiece (filter F) of cigarette S a pneumatic test pressure is applies by means of a known pneumatic reference resistance RC2 (which may even be equal to RC1), while this time keeping the opposite end of the cigarette *open* and detecting, by means of any suitable transducer T2, the value of the pressure reached in the cigarette, generally after a period of time equal to that used for the first inspection (see FIG. 5 and station V in FIG. 1).

Figure 6:
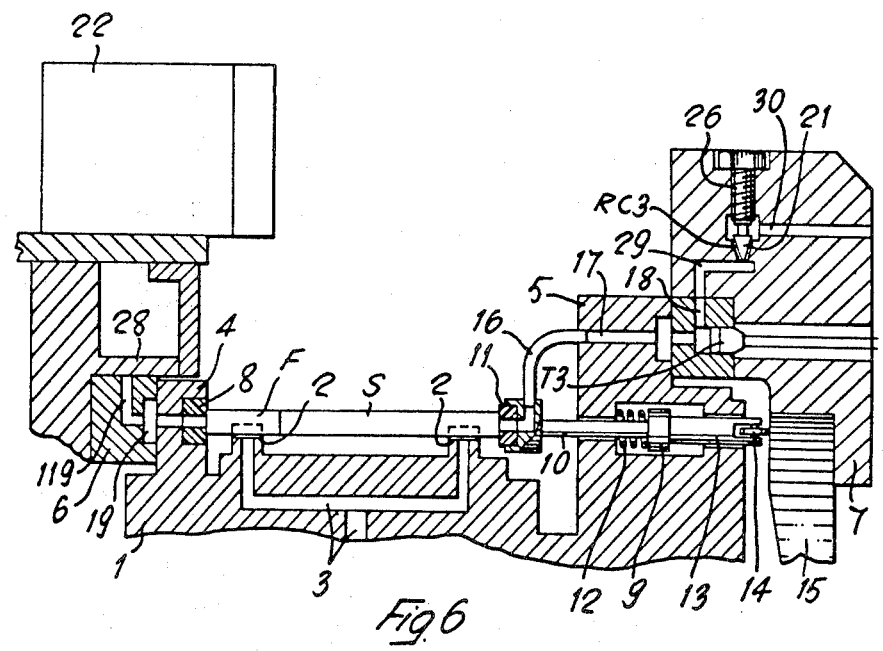

(3) A pneumatic test pressure is applied by means of a known pneumatic reference resistance RC3 (which may be equal to RC1 and/or RC2), at the end of cigarette S opposite to the mouthpiece (filter F), while keeping *closed* the cigarette mouthpiece (filter F) by means of any sealing element A3 and detecting by means of any suitable transducer T3, the value of the pressure reached in the cigarette, generally after a fixed period of time equal to that used for the other inspections (see FIG. 6 and station VI in FIG. 1).

(4) The pneumatic test pressure is applied by means of a known pneumatic reference resistance to the end of cigarette S opposite to the mouthpiece (filter F), while keeping, however, *open* the cigarette mouthpiece (filter F) and detecting, by means of any suitable transducer, the value of the pressure reached in the cigarette, generally after the same time as that used for the other inspections.

The inspections can be made in any order of succession. Furthermore, it is not important which three of the above four inspections are chosen and made. In the embodiment shown and subsequently described, inspections (1), (2) and (3) are made.

From the value of the pressures reached in cigarette S at the end of the three inspections, the equivalent resistances R1, R2 and R3 of cigarette S are determined on the basis of four-terminal network theory. By so doing, the longitudinal permeability of the cigarette depending on R1+R3 and the transversal permeability (ventilation area ZV, wrapper porosity, sealing defects) depending on R2, are determined. In particular, it is also possible to determine the cigarette ratio of ventilation which derives from the ratio R3:(R2+R3).

The above mentioned method can be actuated, as an example, with the mechanical device illustrated in FIGS. 4 to 8. This device consists of a drum 1, rotating continuously or intermittently in the direction of arrow E and peripherally provided with a ring of raised fork-shaped flutes 2 in each of which there lies, for a certain angle of rotation of drum 1, one ventilated cigarette S provided, for instance, with filter F. The cigarette S is held in the respective flute 2 by suction applied by means of ducts 3.

During its stay on drum 1 and in the area of the respective angle of rotation of drum 1, each cigarette S is subjected to the above three inspections (1), (2) and (3). For this purpose, the drum has two side flanges 4 and 5 each sliding on an outer fixed counter flange 6 or 7. In one of these flanges, preferably in flange 4 on the side of the mouthpiece or filter 5 of the cigarettes, there is provided a ring of perforated fixed mouths, each coaxial to a cigarette S. In the other flange 5, corresponding to the end of the cigarettes opposite to the mouthpiece or to the filter, small plungers 9 are mounted free to slide, each coaxial to a cigarette S and integral with a rod 10 which has a head 11 with perforated mouth facing cigarette S. Each plunger 9 is urged by a spring 12 which tends to move head 11 with the mouth away from cigarette S, while it keeps a stem 13 of plunger 9, provided with roller 14, engaged with a fixed cam 15. The perforated mouth of each head 11 is connected by means of a hose 16 to a hole 17 provided in flange 5 of drum 1.

When a cigarette has been placed in a flute 2 of drum 1, plunger 9 is in a position in which head 11 is retracted outward from cigarette S, that is towards flange 5, as shown in the lower part of FIG. 4.

Subsequently, during the rotation of drum 1, plunger 9 is pushed by cam 15 against the action of spring 12 inwardly, that is, towards cigarette S, and moves the latter axially into the respective flute 2, until the cigarette is caused to adhere with its mouthpiece, that is, with the head end of its filter F, in sealed condition to the corresponding fixed mouth 8 in flange 7, while it comprises head 11 with the respective mouth in sealed condition against the opposite end of cigarette S, as shown in FIGS. 4, 5 and 6.

In these conditions, while drum 1 goes on rotating, cigarette S is brought to a first inspection station IV (FIG. 4) in which the mouth in head 11 of plunger 9 communicates by means of hose 16 and of hole 17 in flange 5, with a hole 18 provided in fixed counter flange 7 and closed in sealed condition by means of a cover element 107. Consequently, the cigarette end opposite to the mouthpiece (filter F) is closed in sealed condition. In the meantime, mouth 8 associated with the mouthpiece (filter F) of cigarette S is caused to communicate, by means of ducts and chambers provided in fixed cam 6 and indicated altogether with 19, as well as by means of a small tube 20 and an adjustable throttle valve 21 provided in a fixed sector 22, with a duct 23 connected with a pneumatic pressure stabilizing supply unit 24 (FIG. 1). Then, a pneumatic test pressure is applied to the mouthpiece (filter F) of cigarette S by means of throttle valve 21 which constitutes the known above mentioned pneumatic reference resistance RC1, the upstream pressure of which is determined by a pressure gauge 25 (FIG. 1) derived from the connecting duct between throttle valve 21 and pneumatic pressure stabilized supply unit 24. In the meantime, the mouthpiece (filter F) of cigarette S is caused to communicate with a pressure transducer T1 connected with duct 19 between mouth 8 and throttle valve 21. By so doing, cigarette S is subjected to the above inspection 1). Throttle valve 21 consists of a conical pin valve, which can be adjusted by a screw 26.

During the further rotation of drum 1, cigarette S is brought to a second inspection station V (FIG. 5), in which mouth 8 associated to the mouthpiece (filter F) of the cigarette is caused to communicate, in a manner analogous to the previously described one, by means of ducts 19, 20, 23 provided in fixed counter flange 6 and fixed sector 22, and through a throttle valve 21 incorporated into sector 22 and adjustable by means of screw 26, again with a pneumatic pressure stabilizing supply unit 24 (FIG. 1) and, in parallel with throttle valve 21 as well as upstream of it, with a pressure transducer T2. The opposite end of cigarette S is, however, open, because the mouth associated with it and provided in head 11 of plunger 9 communicates, by means of hose 16 and hole 17 of flange 5, as well as by means of a hole 18 in fixed flange 7, with an open hole 27 of cover element 107. Cigarette S is then subjected to the above mentioned inspection (2), while throttle valve 21 constitutes the known pneumatic reference resistance RC2 according to FIG. 1.

In the next station VI (FIG. 6), outlet 119 of ducts 19 is provided in fixed flange 6 on the side of mouths 8 associated with the mouthpiece (filter F) of cigarette S is closed in sealed condition by means of a cover element 28, whereby the corresponding mouthpiece (filter F) of cigarette S is closed in sealed condition. The mouth associated with the opposite end of cigarette S and provided in head 11 of plunger 9 is caused to communicate, by means of hose 16 and hole 17 provided in flange 5 of drum 1, as well as by means of ducts 18, 29, 30 provided in fixed flange 7 and through a pin throttle valve 21 incorporated into flange 7 and adjustable with the aid of a screw 26 with a pneumatic pressure stabilizing supply unit 24 (FIG. 1) and with a pressure transducer T3 derived upstream of throttle valve 21 from connecting duct 18 between that valve and the mouth of head 11. Under these conditions, cigarette S is subjected to the above mentioned inspection (3), while throttle valve 21 constitutes the known pneumatic reference resistance RC3 according to FIG. 1.

For all of the three test stations IV, V and VI use can also be made of the same pneumatic pressure stabilizing supply unit 24. Pressure transducers T1, T2, T3 convert the pressure into a corresponding electric signal (voltage).

The output signals of transducers T1, T2, T3 correspond to the values of the pressure reached in one cigarette S at the end of inspections (1), (2), (3) effected in respective stations IV, V, VI and can be used in any suitable circuit to decide whether an inspected cigarette can be accepted or must be rejected. For this purpose, the output signal of each transducer T1, T2, T3 can be applied, for instance, to a comparator circuit with at least two thresholds individually adjustable at will. In each of the comparator circuits one of the thresholds is higher and the other lower than the pressure value which is that is considered to be normal for a cigarette considered perfect. If the pressures sensed by the three transducers T1, T2, T3 are all included between the two corresponding thresholds, the respective comparator circuits do not generate any reject signal. If, however, the pressure sensed by even one of the three transducers T1, T2, T3 is lower than the lower threshold or higher than the respective higher threshold, the corresponding comparator circuit generates a reject signal which is used with an appropriate delay to reject the respective inspected cigarette. The rejection occurs at a reject station provided along the path of the cigarettes downstream from the three inspection stations IV, V, VI.

A circuit of the above type is shown in FIG. 1 in which the electric signal of each transducer T1, T2, T3 of each inspection station IV, V, VI is applied, by means of an amplifier 31 with an associated peak pressure meter 32, simultaneously to two comparator circuits 33 and 34, comparator 33 being for the higher threshold and comparator 34 for the lower threshold. Comparators 33 and 34 are associated with reference potentiometers 133 and 134 respectively to establish the respective higher and lower thresholds. The two comparators 33 and 34 can be permanently turned on or can be turned on by a synchronization signal obtained with the aid of a synchronization disk 35 (FIGS. 1a and 4) which rotates integral with drum 1 and, in the illustrated embodiment, has a ring of through holes, whose number and angular distribution correspond to those of the flutes 2, for cigarettes S on drum 1. Located astride of the peripheral perforated part of the synchronization disk 35 is a U-shaped fixed supporting element, of which one arm has a lamp and the other a photoelectric cell 36. The light which passes through holes 135 of rotary synchronization disk 35 generates in photoelectric cell 36 synchronization signals which are applied, by means of a Schmitt Trigger shaping circuit 37, to the two comparator circuits 33, 34 to turn them on in synchronism with the movement of cigarettes S through inspection stations IV, V and VI.

The signals at the output of the pair of comparators 33, 34 associated with each inspection station IV, V and VI are applied to an EXCLUSIVE OR logic circuit 38, whose output is connected to a respective transfer memory 404, 405, 406 of the shift register type. The information stored in the memories 404, 405, 406 is transferred from one stage to the other in synchronism with the movement of the respective inspected cigarette. For this purpose, transfer memories 404, 405, 406 are controlled by means of Schmitt Trigger shaping circuit 37, by the synchronization signals supplied by photoelectric cell 36 associated with disk 35.

The content of the three memories 404, 405, 406 is simultaneously read out at the moment in which the inspected cigarette is at the rejecting device which can be controlled, for instance, by a solenoid valve 41. The outputs of the three memories 404, 405, 406 are each connected to one of the three inputs of an OR circuit 42 which controls, through a timer 43 and an amplifier 34, solenoid valve 41 of the rejecting device. Control of solenoid valve 41 is effected by opening, for instance, the said valve when the signal supplied by any of the three memories 404, 405, 406 is higher than the preset higher threshold or lower than the preset lower threshold. Timer 43 is controlled through an amplifier 45, by synchronization signals supplied, through Schmitt Trigger shaping circuit 37, by photoelectric cell 36 associated with disk 35.

The cigarettes fed to drum 1 and inspected one after the other in stations IV, V and VI can alternatively come from two different rows of cigarettes which have been united between each other by intercalating the cigarettes of one row between the cigarettes of the other row. In this case, it may prove necessary to provide different rejection thresholds for the cigarettes coming from different rows. FIGS. 3 and 3A show partly the circuit of a variant of the embodiment of the device according to the invention which allows introduction of the successive cigarettes on drum 1 alternatively on the basis of two pairs of different thresholds. For this purpose, the output signal of pressure transducer T1 or T2 or T3 of each inspection station IV, V, VI is applied, through respective amplifier 31, simultaneously to four comparator circuits, two 33, 33' for the two different higher thresholds, determined by reference potentiometers 133, 133' and two 34, 34' for the two different lower thresholds, determined by reference potentiometers 134, 134'. The two comparators 33, 34 corresponding to the cigarettes coming from one row and the two comparators 33', 34' corresponding to the cigarettes coming from the other row are alternatively turned on by means of the signals obtained with the aid of synchronization disk 35 which has in this case a ring of holes, in which single holes 135 are alternated with radial pairs of holes 235. This synchronization disk 35 cooperates with two photoelectric cells 36, 136 located on one side of disk 35 and associated with respective light sources located on the opposite side of disk 35.

Photoelectric cell 36 receives the light passing through the holes of the outermost ring of holes, consisting of single holes 135 of the radial pairs of holes 235, while the other photoelectric cell 136 receives the light which also or only passes through the innermost ring of holes, consisting of the innermost holes of the radial pairs of holes 235. The output signals of each pair of comparators 33, 34 and 33', 34' are applied to a corresponding EXCLUSIVE OR logic EXCLUSIVE OR circuits 38, 38'. The outputs of the two circuits 38, 38' EXCLUSIVE OR are connected to the next transfer memory 404 or 405 or 406 of the shift register type, through an OR circuit 39. A circuit of the type shown in FIG. 3 is obviously provided for each of the inspection stations IV, V, VI.

The inspection device according to the invention is located downstream of a ventilated cigarette maker, to inspect the cigarettes supplied by this maker. An increase in the speed of the cigarette maker involves also an increase in the speed of rotation of drum 1 in order to handle the higher flow of cigarettes. Consequently, the time available for inspecting the individual cigarettes in each station IV, V, VI also decreases. Beyond a certain limit value, the increase of the speed of rotation of drum 1 and, consequently, the decrease of the inspection time of each individual cigarette produces a progressive decrease of the pneumatic pressures reached in the cigarette at the end of each inspection. Consequently, inspection signal B (FIG. 10) which is obtained in each inspection rotation and relates to a cigarette of normal quality, becomes lower proportionately to the increase of the cig/min production speed of the maker and, consequently of drum 1. On the other hand, the higher and lower reference thresholds SS and SI respectively, applied to comparator circuits 33, 34, 33', 34' are adjusted, by means of potentiometers 133, 134, 133', 134', for the rated speed of the cigarette maker. Consequently, the thresholds remain constant when the speed of the cigarette maker varies as indicated by the dashed lines in FIG. 10. This gives rise to the inconvenience that cigarettes considered normal and acceptable at normal speeds, may become unacceptable at higher speeds, or cigarettes considered unacceptable at normal speeds may become acceptable at normal speeds.

This inconvenience is eliminated by the invention in which the signals that determine the reference thresholds are supplied by a stabilized power supply, whose output voltage decreases with an increase of the maker speed in a manner corresponding to the respective decrease of the pressure reached in the cigarettes at the end of the inspection and, consequently, of the respective electric inspection signal. An example of an embodiment of this further improvement according to the invention is shown in FIG. 11 for the circuit with two pairs of comparators 33, 34 and 33', 34' according to FIG. 3. As shown in FIG. 11 the reference signal VA (FIG. 12) is supplied by a stabilized power supply unit 46 which receives a voltage proportional to the maker speed, for instance, by means of a tachogenerator 47 or any other equivalent device. Supply unit 46 is, however, designed in such a manner as to supply a output voltage VA which changes, in relation to the maker production speed, with the same law, with which there changes, in relation to said speed, the pressure reached in cigarette S at the end of the inspection and, consequently, the corresponding electric inspection signal B obtained at the output of each inspection station. In particular, the output voltage VA of the stabilized power supply unit 46 decreases with an increase of the maker speed, from a certain limit value, as illustrated in the continuous line diagram in FIG. 12. This output voltage VA supplied by supply unit 46 is applied as a reference signal to comparators 33, 34, 33', 34', by means of 133, 134, 133', 134', which determine the individual level of the respective higher SS and lower SI thresholds. Therefore, these thresholds SS and SI change automatically in relation to the cigarette make speed and, in particular, decrease with an increase in the cigarette maker speed, as indicated by dashed lines in FIG. 12, with a curve analogous to inspection signal B obtained in the respective inspection stations and corresponding to a cigarette of normal quality. Consequently, the same accuracy of inspection is ensured both at the high and low speeds of the maker to which the inspection device according to the invention is associated.

It is understood that the invention is not restricted to the embodiments which have been described, but can be broadly changed and modified, mainly from the construction viewpoint. Thus, for instance, in a variant of the embodiment the analogue inspection signals supplied by the three transducers T1, T2, T3, instead of being applied to comparator circuits can be converted into digital signal which are applied to an appropriate electronic computer capable of calculating, on the basis of the pressures reached in the cigarette at the end of the three inspections, the pneumatic resistances R1, R2 and R3 of the cigarette and of determining the rejection of the cigarettes, if these resistances do not respond to preset tolerances. The inspected cigarettes can be rejected even at three different points of their path, each corresponding to causes of rejection relating to one of the pneumatic resistances R1, R2 and R3. In particular, when an electronic computer is used, the rejection of the cigarettes can be effected separately, for the following causes: (1) for longitudinal or total out of limits permeability; (2) for transversal out of limits permeability; (3) for ventilation ratio out of the preset limits. When use is made of an electronic computer which determines the degree or ratio of ventilation, the signals supplied by the device according to the invention can be used not only for the rejection of the defective cigarettes but also, and only, for controlling the device which determines the permeability of ventilation area ZV and may consist, for instance, of an electroerosion device. All, without departing from the principle of the invention, as described above and for which the following claims are made.

In case use is made of an electronic computer, the synchronization signal, of which reference has been previously made, could be obtained from a so-called ENCODER device of the absolute or incremental type rather than from the synchronization disk 35 (FIG. 1A or 3A).

I claim:

1. Method for the elecropneumatic inspection of the longitudinal and/or transversal permeability of ventilated cigarettes comprising the steps of
    subjecting each cigarette, in any order of succession, to at least three of four tests, said four tests consisting of
        (1) closing one end of said cigarette, applying pneumatic pressure at the other end, and then measuring the magnitude of the pressure reached in the cigarette after a fixed period of time to determine a first pneumatic inlet resistance, (2) leaving open the end of the cigarette closed in test (1), applying pneumatic pressure to the other end and measuring the magnitude of the pressure reached in the cigarette after the same period of time as was used in test (1) to determine a second pneumatic inlet resistance, (3) closing the end of the cigarette to which pressure was applied in tests (1) and (2), applying pressure to the other end of the cigarette and measuring the value of the pressure reached in the cigarette after the same period of time as used in tests (1) and (2) to determine a third pneumatic inlet resistance, and (4) repeating step (3), except that the end which was closed in test (3) is left open to determine a fourth pneumatic inlet resistance;

converting said pneumatic resistances into electric signals; and determining from said electric signals the longitudinal and/or transversal permeability of the cigarette on the basis of four-terminal network theory, the pneumatic resistance of the cigarette being composed of an equivalent transversal resistance, derived from two equivalent longitudinal resistances in series with each other.

2. Method according to claim 1, characterized by the fact that the pneumatic inlet resistance met at each cigarette end is determined by applying a known pneumatic pressure and detecting the air flow when the opposite end of the cigarette is kept open and subsequently closed.

3. Method according to claim 1, characterized by the fact that the pneumatic inlet resistance met at each cigarette end is determined by applying a pneumatic pressure through a known pneumatic reference resistance and detecting the pressure reached in the cigarette when the opposite end of the cigarette is kept open and subsequently closed.

4. Method according to the preceding claim 1, characterized by the fact that the analogue electric signals obtained from the inspections, are converted into digital electric signals and applied to an electronic computer which determines the total pneumatic resistance and/or the longitudinal pneumatic resistance and/or the transversal pneumatic resistance and/or the ratio of ventilation of the cigarette and, when one or more of the said resistances are out of the preset limits, causes the automatic rejection of the defective cigarette and/or controls a device on which there depends the permeability of the area of ventilation of the cigarettes.

5. Device for the electropneumatic inspection of the longitudinal and/or transversal permeability of ventilated cigarettes, comprising means for subjecting each cigarette, in any order of succession, to at least three of four tests, said four tests consisting of (1) closing one end of said cigarette, applying pneumatic pressure at the other end, and then measuring the magnitude of the pressure reached in the cigarette after a fixed period of time to determine a first pneumatic inlet resistance, (2) leaving open the end of the cigarette closed in test (1), applying pneumatic pressure to the other end and measuring the magnitude of the pressure reached in the cigarette after the same period of time as was used in test (1) to determine a second pneumatic inlet resistance, (3) closing the end of the cigarette to which pressure was applied in tests (1) and (2), applying pressure to the other end of the cigarette and measuring the value of the pressure reached in the cigarette after the same period of time as used in tests (1) and (2) to determine a third pneumatic inlet resistance, and (4) repeating step (3), except that the end which was closed in test (3) is left open to determine a fourth pneumatic inlet resistance;

means for determining for each of said tests the drop of the pneumatic pressure at a respective end of the cigarette;

means for converting into electric signals the values of said pneumatic pressures; and means for determining the longitudinal and/or transversal permeability of the cigarette on the basis of four-terminal network theory, the pneumatic cigarette resistance being composed of an equivalent transversal resistance, derived from two equivalent longitudinal resistance in series with each other.

6. Device according to claim 5, characterized by means for applying a known pneumatic pressure alternatively to each cigarette end, and by means for detecting the air flow when the opposite end of the cigarette is kept open and subsequently closed.

7. Device according to claim 5, characterized by means for applying alternatively to each cigarette end a pneumatic pressure through a known pneumatic reference resistance, and by means for detecting the pressure reached in the cigarette when the opposite end of the cigarette is kept open and subsequently closed.

8. Device according to the preceding claim 5, characterized by means for converting the analogue electric signals obtained from the inspections, into corresponding digital electric signals, and by an electronic computer which receives the above digital signals and determines the total pneumatic resistance and/or the pneumatic longitudinal resistance and/or the pneumatic tranversal resistance and/or the ratio of ventilation of the cigarette and/or controls the means for the rejection of the defective cigarettes and/or the means for changing the permeability of the ventilated area of the cigarettes.

9. Device according to the preceding claim 5, characterized by conveying means capable of causing a succession of cigarettes parallel to each other to move in a direction transversal to their axis and in a continuous or intermittent manner, through at least three successive inspection stations, in one of which means are provided for applying a pneumatic pressure to one end of the cigarette and for closing in sealed condition the opposite end of the cigarette; in the other, means are provided for applying a pneumatic pressure to the same cigarette end and for keeping open the opposite end of the cigarette; and in the third, means are provided for applying a pneumatic pressure to the other end of the cigarette and for closing in sealed condition or for keeping open the opposite end of the cigarette, an adjustable throttle valve being interposed, in each inspection station, between the pneumatic pressure supply and the respective cigarette end, while between the throttle valve and the respective cigarette end a transducer is derived which converts the pneumatic pressure into an electric signal.

10. Device according to claim 9, characterized by the fact that to each inspection station at least two comparator circuits are associated, with means for establishing and adjusting individually the respective reference thresholds, the higher and lower ones, and with means for applying simultaneously to both these comparator circuits the electric signal generated by the pressure transducer of the respective inspection station, while the outputs of the two comparator circuits are connected by means of an EXCLUSIVE OR circuit, to a transfer memory, and the outputs of the three transfer memories associated with the three inspection stations are connected, by means of an OR circuit with three inputs and by means of a subsequent timer, to the control means of a device which rejects the defective cigarettes and is located in a point along the trajectory of the cigarettes downstream of the three inspection stations, the comparator circuits, the transfer memories and the timer being controlled by electric synchronization signals coresponding to the rate at which the cigarettes move through the inspection stations.

11. Device according to claim 9, in which the succession of cigarettes parallel to each other is obtained by intercalating between each other the cigarettes of two different rows of cigarettes, characterized by the fact that with each inspection station are associated two pairs of comparator circuits corresponding one to the cigarettes of one row and the other to the cigarettes of the other row and each provided with means for establishing and adjusting individually a higher reference threshold and a lower reference threshold, which pairs of comparator circuits are each connected by means of an EXCLUSIVE OR circuit, and by means of a successive OR circuit, common to both, to the transfer memory associated with the respective inspection station, and are turned on alternatively by means of electric synchronization signals corresponding to the rate at which the cigarettes move through the inspection stations and differentiated for the cigarettes coming from different rows.

12. Device according to the preceding claim 10, in particular, located downstream of a cigarette maker and destined to inspect the cigarettes supplied by the above cigarette maker, characterized by the fact that the signals corresponding to the reference thresholds of the comparator circuits, even if they can be individually changed or adjusted in their level, for instance, by means of potentiometers, are supplied by a stabilized supply unit, which is supplied with a voltage proportional to the cigarette conveying means or to the cigarette maker speed, while its output voltage changes in relation to the speed of the conveying means or of the cigarettes maker, in a manner corresponding to the one with which the pressure reached in the cigarette at the end of the cigarette stay in an inspection station, changes in relation to said speed.

13. Device according to the preceding claim 9, characterized by the fact that the cigarette to be inspected is axiably pressed on the respective conveyor between two perforated mouths, of which at least one is axially movable, and which mouths can be both alternatively connected to a pneumatic pressure source.

* * * * *